(12) United States Patent
Phillips

(10) Patent No.: US 6,406,051 B1
(45) Date of Patent: Jun. 18, 2002

(54) TRAILER HITCH QUICK-RELEASE DRAWBAR

(76) Inventor: Cal M. Phillips, 4435 Jewell La., Platteville, WI (US) 53818

( * ) Notice: Subject to any disclaimer, the term of this patent is extended or adjusted under 35 U.S.C. 154(b) by 0 days.

(21) Appl. No.: 09/694,641

(22) Filed: Oct. 23, 2000

(51) Int. Cl.[7] .................................................. B60D 1/00
(52) U.S. Cl. .................. 280/506; 403/409.1; 280/491.1
(58) Field of Search ........................... 280/491.5, 491.1, 280/506; 403/374.1, 374.5, 409.1

(56) References Cited

U.S. PATENT DOCUMENTS

| | | | |
|---|---|---|---|
| 4,072,257 A | 2/1978 | Hall | 224/29 R |
| 4,080,080 A | 3/1978 | Cisler | 403/108 |
| 5,344,175 A | 9/1994 | Speer | 280/506 |
| 5,372,287 A | 12/1994 | Deguevara | 224/42.03 B |
| 5,423,566 A | 6/1995 | Warrington et al. | 230/415.1 |
| 5,593,172 A | * 1/1997 | Breslin | 280/506 |
| 5,615,904 A | * 4/1997 | Van Dusen et al. | 280/506 |
| 5,681,127 A | * 10/1997 | Willen | 403/322 |
| 5,735,539 A | 4/1998 | Kravitz | 280/506 |
| 6,010,144 A | * 1/2000 | Breslin | 280/506 |

* cited by examiner

Primary Examiner—J. J. Swann
Assistant Examiner—L. Lum
(74) Attorney, Agent, or Firm—John V. Stewart

(57) ABSTRACT

A trailer hitch drawbar 1 having a cam bar 4 mounted along one side such that rotating the cam bar extends or retracts the side of the cam bar 4a along the side of the drawbar. This cam action firmly wedges the drawbar inside a receiver tube 9. An adjustment set screw 2 is provided to set the cam for optimum expansion force in a given receiver tube. A locking pin 5 extends from the drawbar when the cam bar is rotated to the lock position. The locking pin is operated by a second cam surface 4b on the cam bar moving against the inner end of the locking pin. The pin extends into the standard locking pin hole 11 in the receiver tube to prevent longitudinal slippage of the drawbar in the receiver tube. An adjustable drawbar stop 13 sets the penetration depth of the drawbar into the receiver tube to align the locking pin with the locking hole in the receiver tube. This allows instant insertion and locking of the drawbar without searching for pin alignment. The combination of the cam bar and locking pin results in a positive connection of the drawbar in the receiver tube without play, and one that can be quickly released.

8 Claims, 5 Drawing Sheets

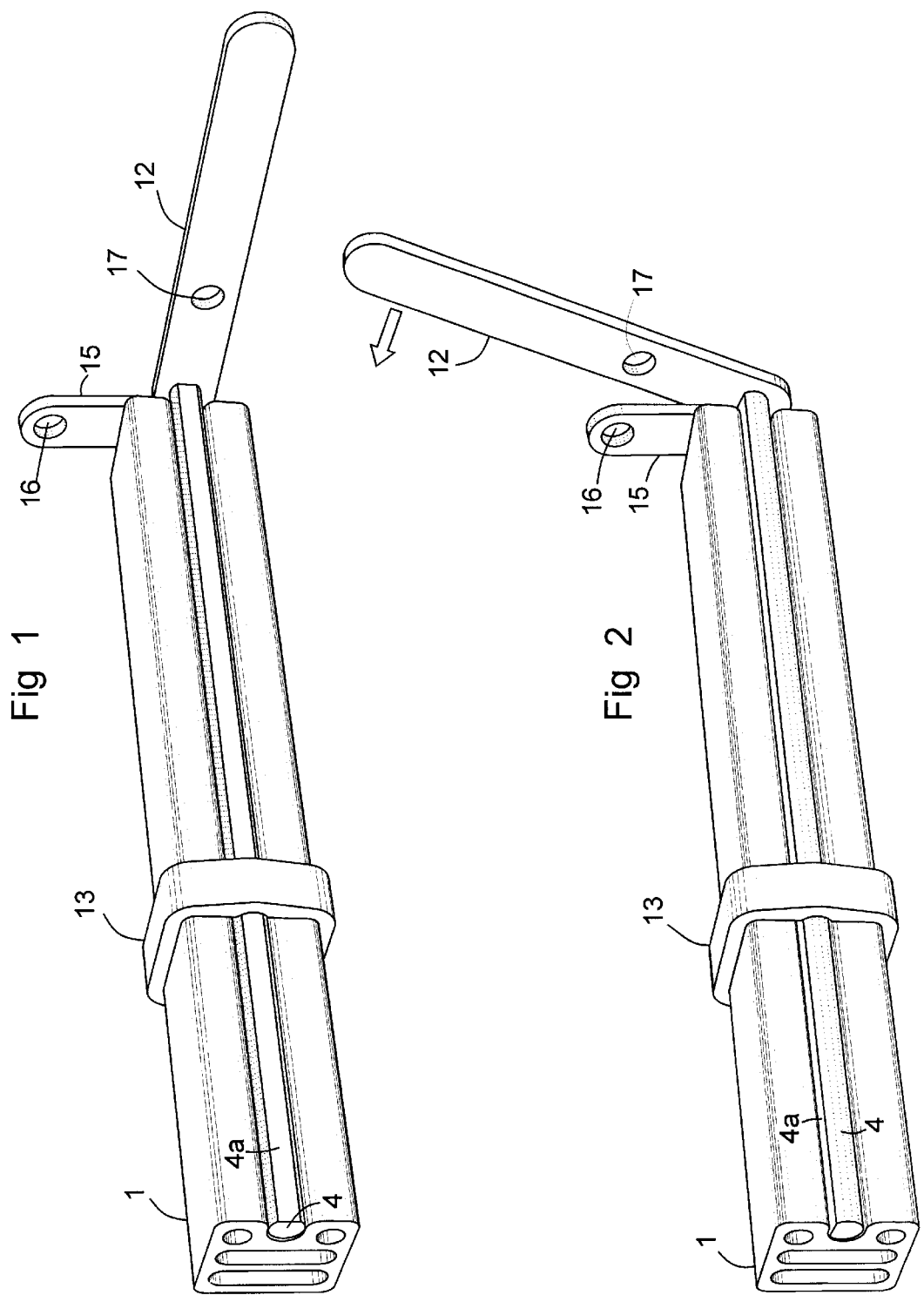

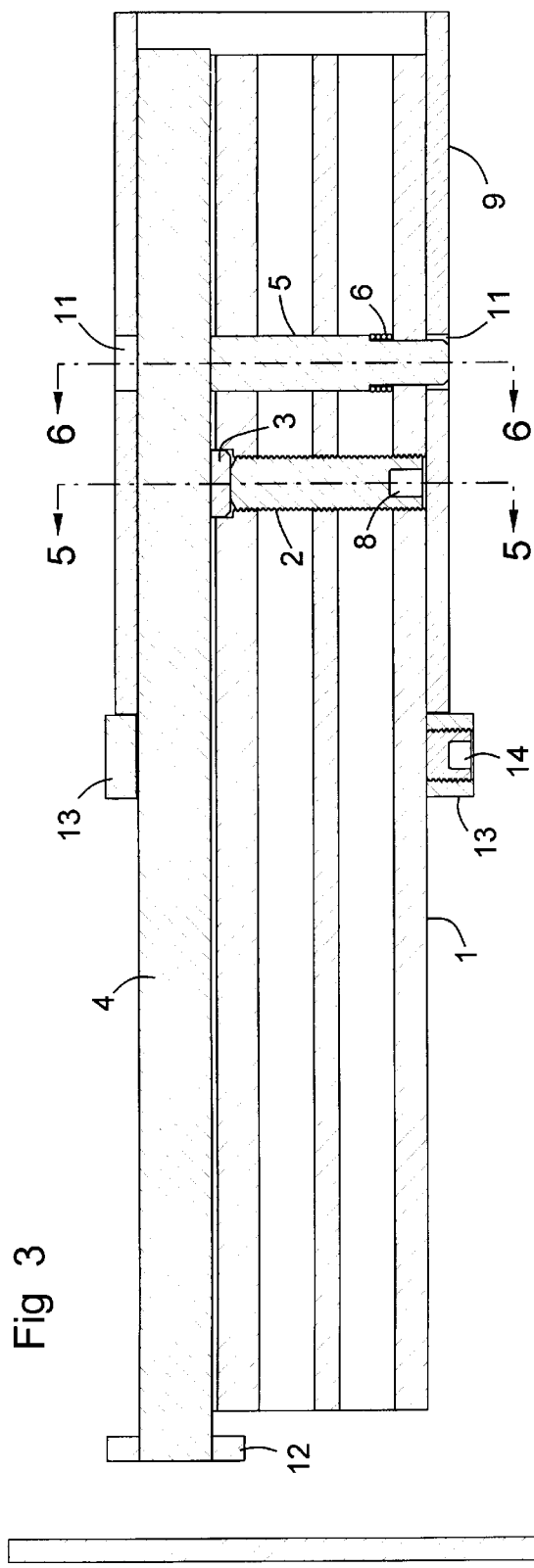
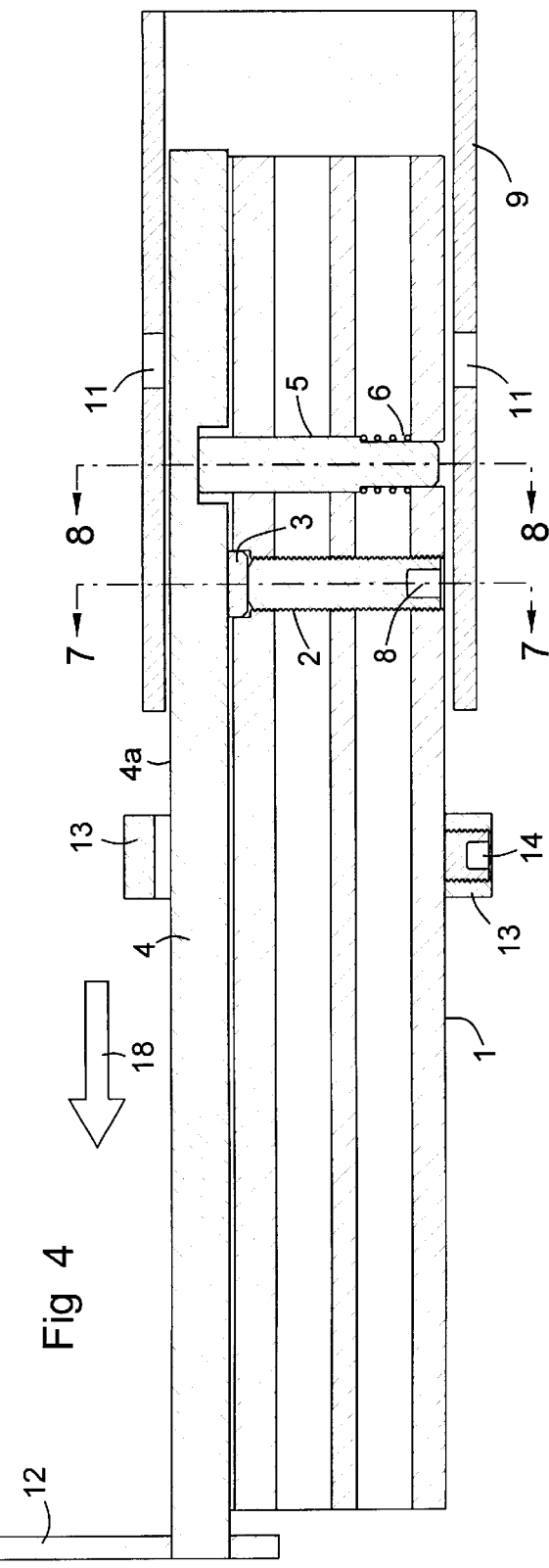

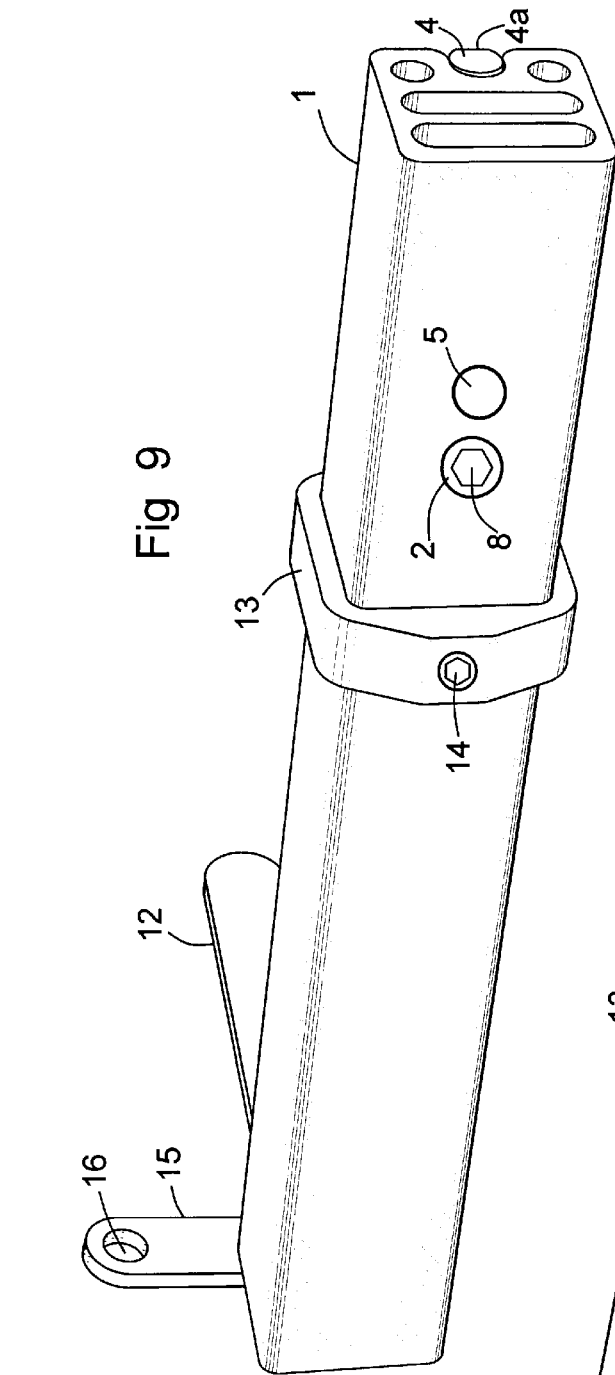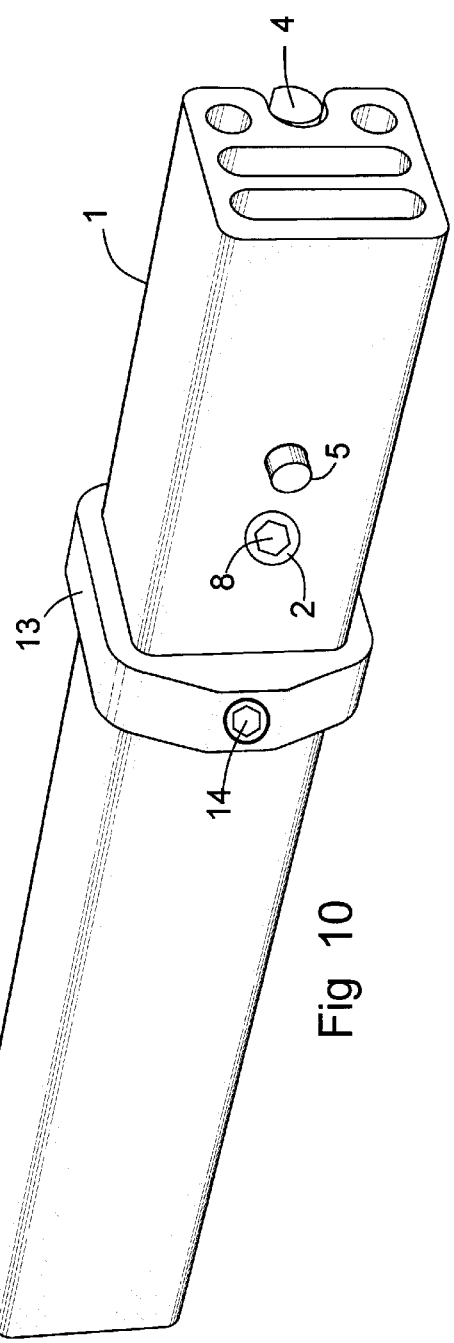

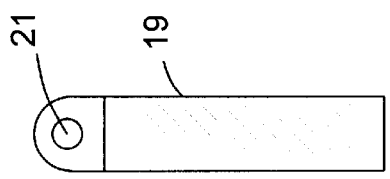
Fig 13
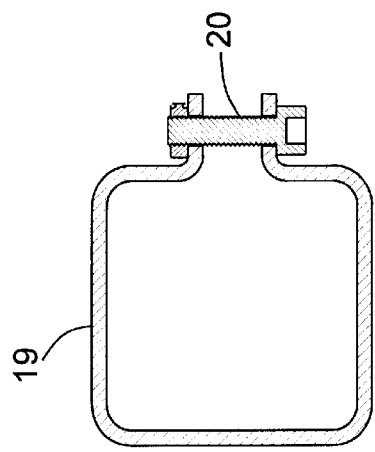
Fig 12
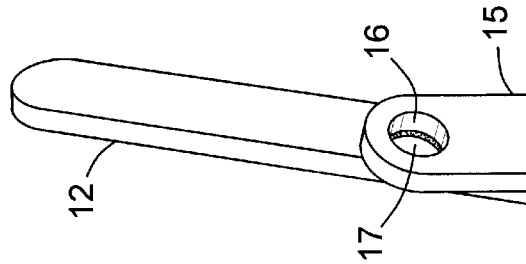
Fig 11
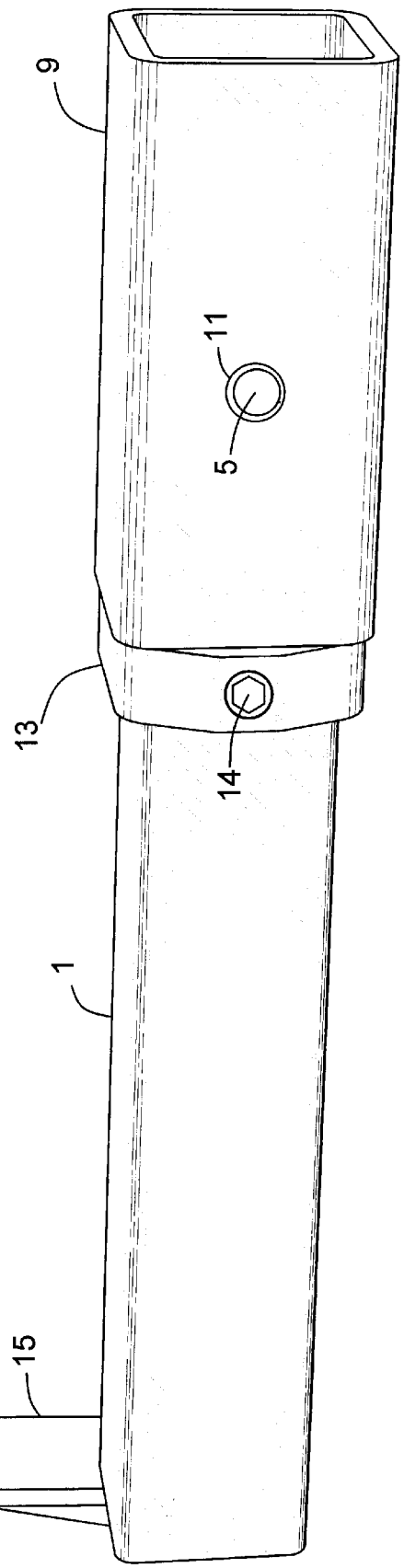

TRAILER HITCH QUICK-RELEASE DRAWBAR

BACKGROUND OF THE INVENTION

1. Field of the Invention

This invention is in the field of motor vehicle trailer hitches of the type having a receiver tube and a drawbar.

2. Description of Prior Art

Trailers are towed behind motor vehicles via a releasable coupling between the trailer and the vehicle. A common type of trailer hitch has a square tube mounted centrally beneath the rear bumper of the vehicle, oriented longitudinally, and open at the back. This is called a hitch receiver tube. A square drawbar is inserted into this tube and locked into it with a pin that passes completely through the tube and the drawbar. The back end of the pin is bent to stop the pin against the receiver tube, and the front end of the pin has a hole to receive a safety retainer such as a spring clip or pad lock. Another locking method is to provide internal threads in the drawbar aligned with the locking pin holes in the receiver tube. A bolt is threaded transversely into the drawbar from outside the receiver tube, and tightened to pull the drawbar against the inner wall of the receiver tube, eliminating play. The bolt may pass completely through the receiver tube and drawbar, exit the opposite side of the receiver tube, and have a lock nut or a transverse hole for a locking clip.

The back end of the drawbar can support any type of coupling mechanism, such as a ball for a trailer socket. The bar can also directly support a bicycle rack behind the vehicle. The present invention improves the convenience, speed, and safety of connecting and disconnecting the drawbar to the receiver tube.

SUMMARY OF THE INVENTION

The objective of the present invention is a trailer hitch drawbar that can be quickly inserted and locked into a trailer hitch receiver tube with a positive connection without play, which can be quickly released and removed.

This objective is achieved with a trailer hitch drawbar 1 having a cam bar 4 mounted along one side such that rotating the cam bar extends or retracts the side of the cam bar 4a along the side of the drawbar. This cam action firmly wedges the drawbar inside a receiver tube 9. An adjustment set screw 2 is provided to set the cam for optimum expansion force in a given receiver tube. A locking pin 5 extends from the drawbar when the cam bar is rotated to the lock position. The locking pin is operated by a second cam surface 4b on the cam bar moving against the inner end of the locking pin. The pin extends into the standard locking pin hole 11 in the receiver tube to prevent longitudinal slippage of the drawbar in the receiver tube. An adjustable drawbar stop 13 sets the penetration depth of the drawbar into the receiver tube to align the locking pin with the locking hole in the receiver tube. This allows instant insertion and locking of the drawbar without searching for pin alignment. The combination of the cam bar and locking pin results in a positive connection of the drawbar in the receiver tube without play, and one that can be quickly released.

BRIEF DESCRIPTION OF THE DRAWINGS

FIG. 1 Left/front perspective view of drawbar in release position.

FIG. 2 Left/front perspective view of drawbar in lock position.

FIG. 3 Top sectional view of drawbar in lock position in hitch receiver tube.

FIG. 4 Top sectional view of drawbar being removed from hitch receiver tube.

FIG. 9 Right/front perspective view of drawbar in release position.

FIG. 10 Right/front perspective view of drawbar in lock position.

FIG. 11 Right/front perspective view of drawbar in lock position in hitch receiver tube.

FIG. 12 Front sectional view of another version of drawbar penetration stop.

FIG. 13 Top view of the drawbar stopper of FIG. 12.

REFERENCE NUMBERS

Figure 5:
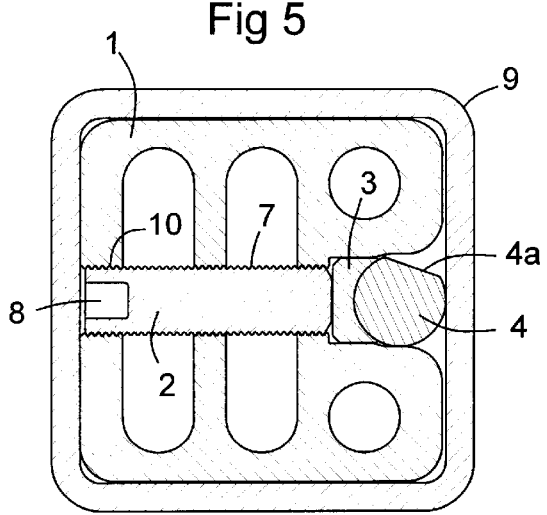
FIG. 5 Front sectional view along line 5—5 of FIG. 3.

1. Drawbar
2. Cam bar adjustment set screw
3. Bushing for Cam bar
4. Cam bar
4a. First cam surface
4b. Second cam surface
5. Locking pin
6. Locking pin spring
7. Threads on set screw
8. Socket for hex key
9. Hitch receiver tube
10. Threads on drawbar
11. Hole in receiver tube
12. Cam bar lever
13. Drawbar penetration stop
14. Set screw for drawbar penetration stop
15. Pad lock security arm
16. Pad lock hole in security arm
17. Pad lock hole in cam bar lever
18. Removal of drawbar from receiver tube
19. Band clamp
20. Band clamp bolt
21. Hole for bolt in band clamp

DESCRIPTION OF PREFERRED EMBODIMENTS

FIGS. 1 and 2 show a leftfront perspective view of a trailer hitch drawbar 1 with a substantially square cross section for insertion in a conventional receiver tube 9. Receiver tubes come in various sizes. An interior dimension of 2 inches square is a common nominal size for a receiver tube. The cross sectional dimensions of a given drawbar provide clearance for insertion of the drawbar into receiver tubes of the corresponding nominal size.

To lock the drawbar in the receiver tube, a cam bar 4 is provided along a first side of the drawbar. The cam bar has a flat portion 4a along one side that aligns approximately flush with the side of the drawbar in a first rotational position of the cam bar. This allows the drawbar to be inserted into a receiver tube without interference. The cam bar has a lever 12 for manual rotation of the cam bar. After the drawbar is inserted into a receiver tube, the lever 12 is rotated, rotating the cam to a lock position (FIGS. 2 and 3) that extends the cam surface laterally away from the first side of the drawbar. The cam surface extends against the interior of the receiver tube, forcing the opposite side of the drawbar against the opposite side of the receiver tube, resulting in a tight fit. Now the drawbar cannot move or vibrate in the receiver tube.

As shown in FIGS. 3 and 4, a cam adjustment set screw 2 is preferably provided to adjust the cam for optimal force in a given receiver tube. This set screw is mounted laterally in the drawbar, contacting the cam bar and holding it at the desired fine position relative to the first side of the drawbar. The cam bar adjustment screw is accessible from the opposite side of the drawbar.

To prevent the drawbar from slipping longitudinally out of the receiver tube, a locking pin 5 is provided. It is mounted laterally in the drawbar, and has one end in contact with the cam bar. The cam bar has a second cam surface 4b at the point of contact with the locking pin. This cam surface extends the locking pin from the second side of the drawbar when the cam bar is rotated to the lock position. The locking pin extends through a hole 11 in the receiver tube 9 that is provided for standard manual locking pins. The present locking pin extends automatically with simple rotation of the cam bar lever to the lock position. The locking pin is urged toward the cam bar with a spring 6. Thus, when the cam bar is rotated to the release position, the lock bar retracts into the drawbar, allowing insertion and removal of the drawbar from the receiver tube.

Figure 6:
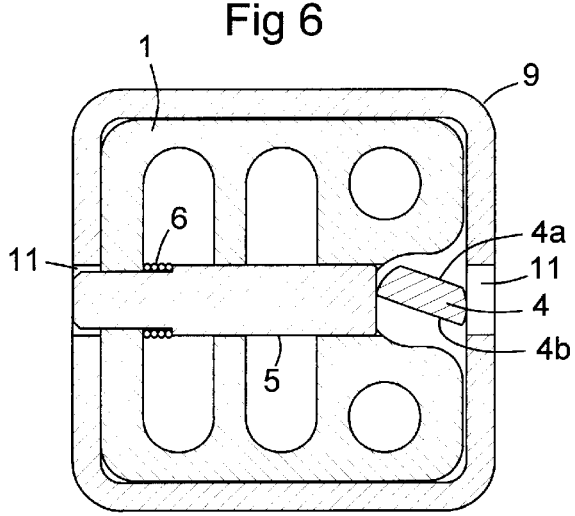
FIG. 6 Front sectional view along line 6—6 of FIG. 3.
Figure 7:
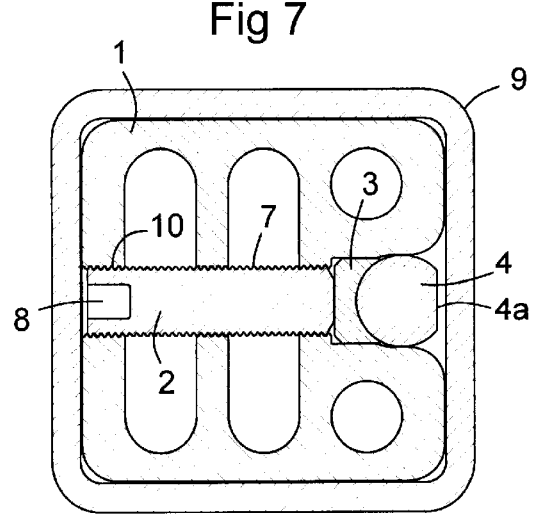
FIG. 7 Front sectional view along line 7—7 of FIG. 4.
Figure 8:
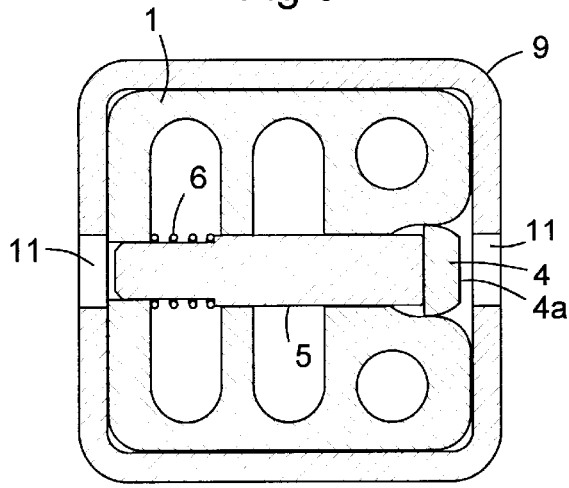
FIG. 8 Front sectional view along line 8—8 of FIG. 4.

A penetration depth stop 13 is preferably provided on the drawbar to stop insertion of the drawbar into the receiver tube at the depth where the locking pin 5 is aligned with the locking pin hole 11 in the receiver tube. This stop can be in the form of a fitted ring or band with a set screw 14 as shown in FIGS. 1–11, or it may take other forms such as a band clamp as shown in FIGS. 12 and 13.

A hole 16 for a padlock or retention clip is preferably provided on an arm 15 or on another part fixed to the drawbar, such as a bike rack structure. A corresponding hole 17 in the cam bar lever 12 allows a user to secure the cam lever bar in the lock position, using a conventional security lock.

Although the present invention has been described herein with respect to preferred embodiments, it will be understood that the foregoing description is intended to be illustrative, not restrictive. Modifications of the present invention will occur to those skilled in the art. All such modifications that fall within the scope of the appended claims are intended to be within the scope and spirit of the present invention. Although the cam surfaces 4a and 4b are shown as flats on the cam bar, they can take other forms such as elliptical or other cross sections, or bent sections of the cam bar. However, flats are easy to machine, and work well.

I claim:

1. A trailer hitch drawbar comprising:
    an elongated drawbar having first and second opposite sides;
    a cam bar having a first cam surface, the cam bar mounted along the first side of the drawbar such that rotating the cam bar extends or retracts the first cam surface laterally toward or away from the first side of the drawbar;
    a locking pin slidably mounted in the drawbar, having a first end contacting the cam bar and a second exiting the second side of the drawbar; and,
    the cam bar having a second cam surface in contact with the first end of the locking pin that extends the locking pin from the second side of the drawbar when the cam bar is rotated to extend the first cam surface laterally away from the first side of the drawbar.

2. The trailer hitch drawbar of claim 1, further comprising an adjustable stop ring mounted around the drawbar at a selectable longitudinal position to set a penetration depth of the drawbar into a trailer hitch receiver tube; whereby the stop ring can be set to automatically stop the drawbar at a position where the locking pin is aligned with a locking pin hole in a given receiver tube.

3. The trailer hitch drawbar of claim 1, further comprising a cam bar adjustment set screw threaded into the drawbar from the second side, having an end in contact with the cam bar to set the cam for optimum extension force against an interior wall of a given receiver tube.

4. A trailer hitch drawbar quick-release retention mechanism comprising;
    a drawbar having front and back ends, first and second opposed sides, and a longitudinal axis from front to back;
    a cam bar having a longitudinal axis and having a first cam surface along at least part of its length;
    the cam bar mounted in the first side of the drawbar for rotational movement about the cam bar axis;
    the cam bar having a lock position of rotation in which the first cam surface extends maximally laterally from the first side of the drawbar;
    the cam bar having a release position of rotation in which the first cam surface is approximately flush with the first side of the drawbar;
    a cam bar lever attached to the cam bar for manual rotation of the cam bar;
    a locking pin mounted laterally in the drawbar having an end exiting the second side of the drawbar;
    a second cam surface on the cam bar operating against the locking pin to extend the locking pin laterally from the second side of the drawbar in the lock position of the cam bar; and
    a spring urging the locking pin against the second cam surface of the cam bar.

5. The trailer hitch drawbar of claim 4, further comprising an adjustable stop ring mounted around the drawbar at a selectable longitudinal position to set a penetration depth of the drawbar into a trailer hitch receiver tube; whereby the stop ring can be set to automatically align the locking pin with a locking pin hole in a given receiver tube.

6. The trailer hitch drawbar of claim 4, further comprising a cam bar adjustment set screw threaded into the drawbar from the second side, having an end in contact with the cam bar to set the cam for optimum extension force against an interior wall of a given receiver tube.

7. The trailer hitch drawbar of claim 4, further comprising a security arm attached to the drawbar adjacent the cam bar lever in the lock position of the cam bar, a hole in the security arm, and a corresponding hole in the cam bar lever.

8. A trailer hitch drawbar comprising:
    an elongated drawbar having first and second opposite sides and a length;
    locking means comprising a pin through the drawbar for engaging a transverse hole in a trailer hitch receiver tube, and
    an adjustable stop ring mounted on the drawbar at a selectable longitudinal position to set the penetration depth of the drawbar into a trailer hitch receiver tube.

* * * * *